United States Patent

[11] 3,582,820

[72] Inventor Elias Snitzer
 Wellesley, Mass.
[21] Appl. No. 724,854
[22] Filed Apr. 29, 1968
[45] Patented June 1, 1971
[73] Assignee American Optical Corporation
 Southbridge, Mass.

[54] ERBIUM LASER DEVICE
 9 Claims, 3 Drawing Figs.
[52] U.S. Cl. ........................................................ 331/94.5
[51] Int. Cl. ...................................................... H01s 3/00
[50] Field of Search ............................................ 331/94.5

[56] References Cited
 UNITED STATES PATENTS
 3,284,722 11/1966 Gray............................ 331/94.5
 3,354,404 11/1967 Boyle et al. ................. 331/94.5
 3,453,215 7/1969 Carnall, Jr. et al............ 331/94.5X
 3,316,501 4/1967 Collins et al. ................. 331/94.5

OTHER REFERENCES
" Glass Lasers"; E. Snitzer, APPLIED OPTICS, Vol. 5, No. 10.

Primary Examiner—Ronald L. Wibert
Assistant Examiner—Conrad Clark
Attorneys—J. Albert Hultquist and Noble S. Williams ABSTRACT: A laser device comprised of first and second laser cavities having a trivalent neodymium-doped laser rod positioned within said first laser cavity, and a trivalent ytterbium-trivalent erbium-doped laser rod within said second laser cavity. Coupled to said first cavity is a flash tube for producing a state of population inversion within said neodymium-doped rod and the resulting laser energy at 1.06 or 0.92 microns is directed into said ytterbium-erbium rod within said second cavity to produce a state of population inversion within said erbium ions to produce laser energy at 1.5 microns which is coupled from said second cavity to the exterior for utilization.

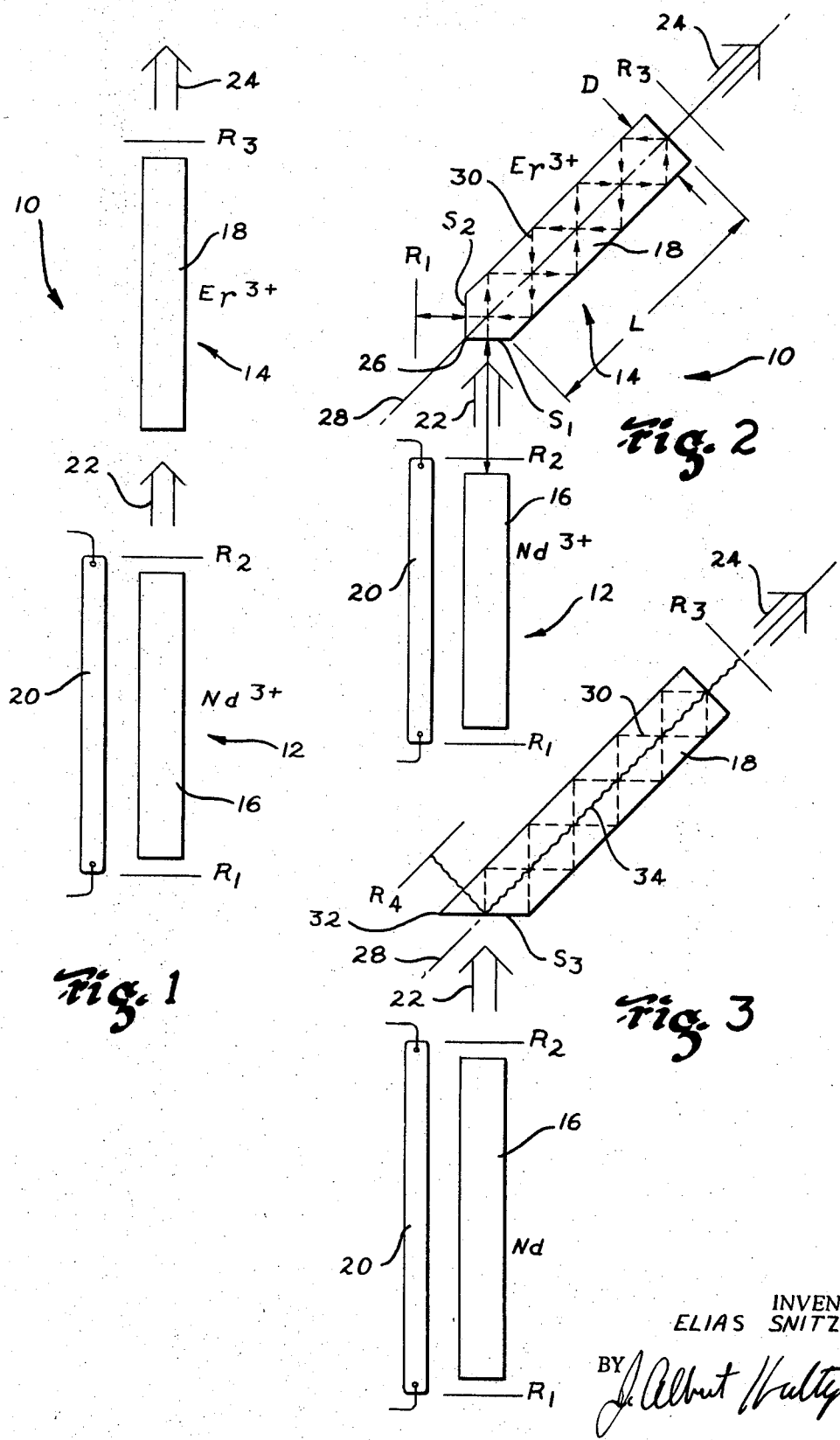

ERBIUM LASER DEVICE

BACKGROUND OF THE INVENTION

The field of this invention is laser devices. Prior art laserable materials containing trivalent erbium as the active laser ion have been increased in efficiency by the inclusion within the host material of sensitizer ions to assist in pumping the trivalent erbium ions from a ground state to an excited level. An energy transfer scheme taught in U.S. Pat. application Ser. No. 420,270, filed Dec. 22, 1964, and assigned to the assignee of the present application employs trivalent ytterbium as a sensitizer for trivalent erbium. However, trivalent ytterbium does not absorb all of the wavelengths emitted by a flash tube. In fact, ytterbium absorbs only a small portion of the total amount of light produced by the flash tube. To increase absorption and hence the pumping efficiency, trivalent neodymium is included as a sensitizer ion for ytterbium. Unlike ytterbium, neodymium has absorption bands in the visible portion of the spectrum and is, therefore, able to absorb the light emitted by the flash tube in this portion of the spectrum. However in that arrangement, the neodymium ions which are added to act as sensitizers and thus absorb more of the light from the pump source also tend to quench the erbium ions, even at low neodymium ion concentrations. However, by pumping ytterbium ions by laser light at 1.06 or 0.92 microns from a neodymium-doped laser, energy received by the ytterbium ions can be transferred to the erbium ions and an efficient means for producing a state of population inversion in the erbium ions results. Also, two additional results are achieved. First, since ytterbium absorbs at 0.92 and 1.06 microns, a high percent of pumping energy is absorbed. Secondly, since the neodymium ions are no longer near neighbors to the erbium ions there is no danger of erbium ions being quenched by neodymium ions.

SUMMARY OF THE INVENTION

A laser device contains an ytterbium-erbium-doped host rod and a neodymium laser generator capable of generating laser energy at either 0.92 or 1.06 microns. Laser light from the neodymium generator is coupled into the ytterbium-erbium-doped rod. This causes a state of population inversion to exist within the ytterbium-erbium-doped rod. The resultant laser emission from the erbium ions is in the vicinity of 1.5 microns. By pumping an ytterbium-erbium laser rod with the output of a neodymium laser generator, greater pumping efficiency results. A flash tube emits a large amount of light which is not absorbed causing heating of the laser rod. It has been observed that the amount of heat produced in the ytterbium-erbium rod by pumping with a neodymium generator is small when compared to the amount produced in a similarly doped rod pumped to the same extent by a conventional flash tube.

It is an object of this invention to provide an improved erbium laser device capable of producing laser emission at 1.5 microns at room temperature, in which the erbium ions are pumped by laser energy from a neodymium laser generator.

A further object of this invention is to provide efficient means for pumping an ytterbium-erbium laser wherein a large percent of the pumping energy will be absorbed by the ytterbium ions producing a laser device in which only a small amount of the energy from the pumping source heats the laser rod as it is being pumped.

BRIEF DESCRIPTION OF THE DRAWING

FIG. 1 is a diagrammatic view illustrating an embodiment of the invention;

FIG. 2 is a diagrammatic view illustrating a modification of the embodiment of the invention as shown in FIG. 1; and FIG. 3 is a diagrammatic view illustrating a further modification of the embodiment of the invention as shown in FIG. 2.

DESCRIPTION OF THE PREFERRED EMBODIMENTS

Lasers are light-amplifying, light-producing devices and are specifically adapted to provide an output of high intensity, coherent, monochromatic light. Such light is produced by photonic emission from the active ions disposed within the body or core of a laser material. The atoms which are normally in a "positive temperature" condition absorb quanta of light from an energy source, such as a flash lamp. The ions are thus excited to a higher energy level and a "negative temperature" state of population inversion from which they rapidly relax to a more stable intermediate level. From the more stable intermediate level the ions then make a transition, normally at a slower rate, to the original level or ground state with an attendant emission of light. The emission by transition from the intermediate level to the ground state is fluorescent. An intense output in a narrow cone is provided by the structure of the laser device which is in a cavity, one end of which is totally reflective, and the other end of which is slightly transmissive. In this invention, erbium is selected as the laserable ion and is present within a host rod, said host rod being essentially transparent to light energy at the laser-emissive wavelength of erbium. Erbium is present in laserable quantities, and when a population inversion is established in the erbium ions, a radiative transition from a selected energy level of erbium to a lower level is possible, and in relationship to the prevailing laser-emissive light-absorptive characteristics of the host rod, supports in said host rod a sufficient inversion in population between two energy levels of said erbium ions as to provide at the wavelength of stimulated emission of said erbium ions enough gain in light energy by stimulated emission in excess of all light energy losses in said laserable rod.

Also provided is a laser generator wherein neodymium is the laserable ion. Trivalent neodymium is distributed within a host material of the generator, said host being essentially transparent to light energy at the laser-emissive wavelength of trivalent neodymium. The neodymium is also present in a concentration so that a sufficient inversion in population may be established between two energy levels so as to provide enough gain in the laser wavelength of stimulated emission to overcome all light losses within the neodymium laser material.

As is taught in U.S. Pat. application Ser. No. 420,270, filed Dec. 22, 1964, and assigned to the assignee of the instant application, greater efficiency can be obtained by using ytterbium ions as sensitizers for erbium. Trivalent ytterbium can be pumped by an energy source from an initial ground level designated as $^2F_{7/2}$ to an upper level $^2F_{5/2}$. An energy transfer can then occur from the upper level of trivalent ytterbium to the upper level $^4I_{11/2}$ of trivalent erbium. A nonradiative transition then occurs from the $^4I_{11/2}$ level of erbium to the $^4I_{13/2}$ level of erbium. Subsequent transition occurs between energy level $^4I_{13/2}$ and $^4I_{15/2}$ producing the laser output.

However, as was explained earlier, ytterbium does not absorb all the wavelengths of light energy produced by a flash tube. In order to increase absorption from a flash tube, prior art materials have incorporated small amounts of neodymium in the ytterbium-erbium host. However, neodymium, even at relatively low concentrations, can quench the fluorescence of neighboring erbium ions.

By providing an ytterbium-erbium-doped rod as is taught in U.S. Pat. application Ser. No. 420,270, the teachings of which are incorporated into the instant application by reference, and by pumping the ytterbium-erbium rod with laser energy at either 0.92 or 1.06 microns from an optically coupled neodymium-doped laser light generator, efficient absorption of the pumping light by ytterbium ions results, and since the neodymium ions are not neighbors to the erbium ions, quenching of the erbium ions by neodymium is eliminated. It has also been discovered by applicant that the pumping efficiency at 1.06 microns can be increased by heating the ytterbium-erbium rod so as to increase the absorption coefficient of the ytterbium ions at 1.06 microns.

In the present invention, laser light at either 0.92 or 1.06 microns excites the ytterbium ions to the upper $^2F_{5/2}$ level and the ytterbium ions transfer energy to the erbium ions ultimately resulting in laser output from erbium.

Accordingly, the devices of the instant invention utilize an ytterbium-erbium doped host rod which is pumped by a laser beam at either 0.92 or 1.06 microns. This laser beam originates from a neodymium doped laser light generator. The term "laser light generator" is intended to include laser oscillators and laser amplifiers. When a rod is doped with ytterbium and erbium ions, energy which has been received by ytterbium raises the electrons in ytterbium to an excited energy level, ytterbium thereafter transfers this energy to erbium and thereby enables a population inversion to occur in the erbium ions. Accordingly, it is within the scope of this invention that the ytterbium-erbium doped rod may form an oscillator, the resonant cavity of which has one end totally reflective, and the other end slightly transmissive, said oscillator being pumped solely by laser energy from a neodymium laser light generator at either 1.06 or 0.92 microns.

The method of pumping an ytterbium-erbium rod with laser energy from a neodymium laser light generator may also be utilized in a laser amplifier. Laser energy from neodymium can be used as the pump source to produce a state of population inversion with ytterbium-erbium-doped amplifier. Thus, a laser pulse originating from an erbium laser oscillator can be introduced into an ytterbium-erbium amplifier, which amplifier has been pumped by laser energy from a neodymium laser light generator. It is intended to be within the scope of this invention to include any laser device in which a population inversion in erbium is produced in an ytterbium-erbium host when the inversion results from pumping from a separate neodymium laser light generator.

Three configurations for laser oscillator devices are shown in FIGS. 1—3.

Referring to FIG. 1, the laser device 10 includes first laser cavity 12 formed by reflectors $R_1$ and $R_2$ and second laser cavity 14 formed by reflectors $R_2$ and $R_3$. Positioned within cavity 12 is a trivalent neodymium-doped rod 16. Positioned within cavity 14 is a trivalent ytterbium-trivalent erbium-doped rod 18. Closely wrapped or in some other way disposed close to neodymium laser rod 16 is flash tube 20. Said flash tube 20 provides pumping energy and produces a state of population inversion in said trivalent neodymium ions within rod 16. Located at an end of laser cavity 12 furthest from laser cavity 14 is reflector $R_1$. Reflector $R_1$ has essentially 100 percent reflectance for light at a wavelength of 1.06 microns. Separating first cavity 12 and second cavity 14 is reflector $R_2$. Reflector $R_2$ is dichroic and is essentially of 100 percent reflectance for light energy of 1.5 microns but with less reflectivity for light of a wavelength of 1.06 microns so that 1.06 micron energy can be coupled out. For example, reflector $R_2$ may have a reflectivity for 1.06 microns of 50 percent or less. Light energy is produced by the stimulated emission of the trivalent neodymium within rod 16 and oscillates back and forth between reflectors $R_1$ and $R_2$ with an output as shown by arrow 22. The laser energy represented by arrow 22 enters rod 18, excites the trivalent ytterbium ions, the ytterbium ions transfer this energy to neighboring erbium ions and produce a state of population inversion in said erbium ions. At an end of second laser cavity 14, opposite reflector $R_2$, is reflector $R_3$. Reflector $R_3$, like reflector $R_2$, is dichroic. Its reflectivity, however, is 100 percent for wavelengths of 1.06 microns to provide for returning any 1.06 energy which may pass entirely through rod 18 into the rod for efficient utilization, but approximately 60 percent for energy of a wavelength of 1.5 microns. Light resulting from the stimulated emission of the trivalent erbium ions oscillates in phase within said cavity 14 between reflectors $R_2$ and $R_3$ with an output at 1.5 microns as shown by arrow 24.

In FIG. 2 an alternate embodiment is shown. Here, trivalent ytterbium-trivalent erbium-doped rod 18 is peaked at a 90° angle as is shown at 26 forming a roof, of which one face $S_1$ is aligned parallel to an end surface of rod 16. Rod 18 is positioned in second cavity 14 at a 45° angle to rod 16. Laser light at 1.06 microns, therefore, enters rod 18 at a 45° angle to axis 28 of rod 18. Length L of rod 18 is chosen to be an integral multiple of the width D. Thus, the laser light from neodymium rod 16 travels down rod 18 along the path of dotted lines 30 to the flat end, returns to the roof end, where it is normal to the plane of the surface $S_2$. Reflector $R_1$ is placed parallel to surface $S_2$, and the light is returned to rod 18 as is shown by dotted lines 30. Laser light travelling in a path indicated by dotted lines 30 will excite ytterbium ions within this path and the ytterbium ions will transfer this energy to produce a state of population inversion in the erbium ions. Roof 26, by total internal reflection, acts as a reflector and reflects light resulting from the stimulated emission of the erbium ions along a path parallel to its direction of arrival. Thus a resonant cavity is created by roof 26 and reflector $R_3$ with an output at 1.5 microns as shown by arrow 24.

FIG. 3 represents an embodiment similar to that shown in FIG. 2 but with a single sloping surface $S_3$ forming a 45° angle at 32. Surface $S_3$ is parallel to the adjacent flat end of rod 16. Laser energy at 1.06 microns enters rod 18 incident to surface $S_3$ and is reflected along the path shown by the dotted lines 30, exciting ytterbium ions along path 30. An energy transfer takes place between the ytterbium ions and the erbium ions similar to that described above. Reflector $R_4$ is provided along one side of rod 18 parallel to axis 28 of rod 18. Reflector $R_4$ is essentially a 100 percent reflector for energy of a wavelength of 1.5 microns and with reflector $R_3$ forms the resonant cavity for rod 18. Thus, light caused by the stimulated emission of erbium ions within rod 18 oscillates along a path indicated by wavy line 34 with attendant laser emission in the direction of arrow 24 as shown in FIG. 3.

I claim:

1. A laser device comprising
   a neodymium doped laser rod for emitting light energy having a wavelength of approximately 1.06 microns,
   an ytterbium-erbium-doped laser rod for emitting light energy having a wavelength of approximately 1.5 microns,
   a first laser cavity having the neodymium-doped laser rod disposed therein and aligned therewith and resonant at a wavelength of 1.06 microns
   pumping means optically coupled to the neodymium-doped laser rod for producing a state of population inversion of the neodymium ions therein,
   a second laser cavity having the ytterbium-erbium-doped laser rod disposed therein and aligned therewith and resonant at a wavelength of 1.5 microns,
   means for coupling light energy having a wavelength of approximately 1.06 microns from the first resonant laser cavity into the second resonant laser cavity, and
   means for allowing the emission of light energy having a wavelength of approximately 1.5 microns from the second laser cavity while substantially totally reflecting back into the second resonant laser cavity light energy having a wavelength of approximately 1.06 microns, 2. A laser device according to claim 1, in which the means for coupling comprises a dichroic filter which is slightly transmissive to light energy having a wavelength of 1.06 microns and totally reflective to light energy having a wavelength of 1.5 microns.

3. A laser device according to claim 2, in which the first resonant laser cavity is defined by a totally reflective means and the dichroic filter, the second resonant cavity being defined by the dichroic filter and a second dichroic filter which is slightly transmissive to light energy having a wavelength of 1.5 microns and is substantially totally reflective to light energy having a wavelength of 1.06 microns.

4. A laser device according to claim 3 in which the first and second resonant cavities are aligned along a common optical axis.

5. A laser device according to claim 1, in which the axis of the neodymium-doped laser rod is at an angle of approximately 45° to the axis of the ytterbium-erbium-doped laser rod and the first resonant laser cavity is defined by a pair of reflective elements, one of which is totally reflective to light energy at a wavelength of 1.06 microns and the other of which is slightly transmissive to such light energy so as to couple such light energy from the first resonant laser cavity to the second resonant laser cavity.

6. A laser device according to claim 5, in which the ytterbium-erbium-doped laser rod has a 45° roof formed on the end thereof which is adjacent the first resonant laser cavity, the roof being formed so as to have one face normal to the direction of propagation of the 1.06 micron wavelength light energy, an element which is totally reflective to light energy at a wavelength of 1.06 microns is disposed parallel to the other face of the roof, and the length of the ytterbium-erbium-doped laser rod is an integral multiple of the diameter thereof.

7. A laser device according to claim 6 in which the second resonant laser cavity is defined by the roof on the ytterbium-erbium-doped laser rod and a reflective element which is slightly transmissive to light energy at 1.5 microns wavelength, the element being disposed adjacent the other end of the ytterbium-erbium-doped laser rod to emit the 1.5 microns wavelength light energy from the device.

8. A laser device according to claim 5, in which the ytterbium-erbium-doped laser rod has an entrance face formed on the end thereof adjacent the first resonant laser cavity which is at a 45° angle to the axis of the rod and normal to the direction of propagation of the 1.06 micron wavelength light energy.

9. A laser device according to claim 8, in which the second resonant laser cavity is defined by an element which is totally reflective to light energy at a wavelength of 1.5 microns and an element which is slightly transmissive to light energy at 1.5 microns wavelength, the totally reflective element being disposed parallel to the axis of the ytterbium-erbium-doped laser and at a 45° angle to the entrance face so as to be normal to the direction of propagation of light energy reflected by the entrance face, and the other element being disposed adjacent the other end of the ytterbium-erbium-doped laser rod.